United States Patent [19]
Bates

[11] 3,818,588

[45] June 25, 1974

[54] ELECTRICAL BRUSHES

[75] Inventor: James John Bates, Shrivenham, England

[73] Assignee: National Research Development Corporation, London, England

[22] Filed: Mar. 29, 1973

[21] Appl. No.: 346,022

[30] Foreign Application Priority Data
Mar. 30, 1972  Great Britain.................. 15085/72

[52] U.S. Cl..................... 29/630 E, 29/419, 29/420
[51] Int. Cl.............................................. H01r 9/00
[58] Field of Search...... 29/630 E, 419, 419 G, 420; 310/42, 248, 251, 252, 253

[56] References Cited
UNITED STATES PATENTS

| | | | |
|---|---|---|---|
| 539,453 | 5/1895 | Thomson | 310/248 |
| 539,454 | 5/1895 | Thomson | 310/248 |
| 3,382,387 | 5/1968 | Marshall | 310/248 |
| 3,525,006 | 8/1970 | Parr et al. | 310/252 |
| 3,550,247 | 12/1970 | Evans et al. | 29/419 |
| 3,553,820 | 1/1971 | Sara | 29/419 |
| 3,571,901 | 3/1971 | Sara | 29/419 |
| 3,668,451 | 6/1972 | McNab | 310/248 |

*Primary Examiner*—Charles W. Lanham
*Assistant Examiner*—James R. Duzan
*Attorney, Agent, or Firm*—Cushman, Darby & Cushman

[57] ABSTRACT

An electrical brush is constructed by moulding an aligned array of metal coated carbon fibres into a block. The block may be several times the required length and width of a brush, in which case it is then cut into strips corresponding to the desired length of a brush. The coating is then removed for part only of the lengths of the brushes to expose the individual carbon fibres at one end but leaving them consolidated for connection to a conductor at the other end. The strips are finally cut up to form individual brushes.

9 Claims, No Drawings

ELECTRICAL BRUSHES

This invention relates to electrical brushes.

Electrical brushes are used to pass current between conductors and conducting surfaces such as commutators or slip rings moving relatively thereto. The material that is usually used for such brushes is carbon. One recently suggested form of carbon brush is a brush in which the carbon is in fibre form and it is the object of the invention to provide a method of manufacturing carbon fibre brushes.

According to the invention a method of manufacturing an electrical brush comprises the steps of forming a block of an aligned array of carbon fibres embedded in a matrix of conductive material and then removing the conductive material along part only of the length of the block to expose the carbon fibres at one end but leaving the remaining parts of the fibres consolidated in the matrix of conductive material for enabling connection to be made to a conductor.

In carrying out the invention the carbon fibre block may be formed by first coating the carbon fibres with a suitable metal and then pressing the coated fibres together while heating them so that the coatings of the individual fibres are welded together.

The metal coating may be applied by a plating process. Alternatively, the block may be formed by wetting the carbon fibres with a suitable metal in liquid form and then pressing the wetted carbon fibres together and cooling them to solidify the metal.

Suitable metals for use in the coating process are copper and tin.

The carbon fibre block may be formed to have any length that is convenient for manufacture and the block can then be cut into individual lengths appropriate to the length of a carbon fibre brush.

An appropriate radius may be machined at one end of each individual length of carbon fibre block prior to removal of the plating to improve contact with a commutator when the brush is installed in an electrical machine.

In order that the invention may be more fully understood reference will now be made to the following example of carrying out the invention. Carbon fibres of the kind known as type II which have a relatively low Young's modulus of the order of $30 \times 10^6$ psi and a relative high tensile strength of the order of 0.4 to $0.45 \times 10^6$ psi are plated in a cyanide bath, the solution that is used being known as a Rochelle copper cyanide solution. A suitable composition for this solution is as follows:

| | |
|---|---|
| Copper Cyanide | 4.8 oz/gal |
| Sodium Cyanide | 6 oz/gal |
| Free Cyanide | ½–1 oz/gal |
| Rochelle Salt | 8 oz/gal |
| Sodium Carbonate | 6 oz/gal |

Where the plating bath is operated at room temperature a suitable current density for the current passed through the bath is about 10mA/cm². If desired the plating bath can be heated to about 50°C in which case a lower current density can be used in order to obtain a more even coating. In the plating operation a considerable amount of gas is evolved which helps to separate the fibres from each other and ensure good penetration of the copper plating.

It is desirable to coat the fibre to a depth which is less than the thickness of the fibres and typically for fibres of a diameter of 8mc the plating can be applied to a depth of 1–3 microns.

After the carbon fibres are plated they are then moulded into a block. The shape of the moulded block can be that of a relatively flat rectangular plate of thickness corresponding to the desired thickness of a brush and of length (being in the direction of lie of the carbon fibres in the block) which is several times the desired length of an individual brush. The width of the plate can be that of an individual brush but more conveniently is made several times the desired width of a brush.

The moulding is achieved by applying sufficient temperature and pressure to the plated fibres when they are packed into a mould to sinter the copper. Suitable temperatures are in the range of 700° to 900°C and suitable pressures are about ½ to 1 ton per square inch. It is desirable to carry out the moulding operation in a vacuum or in an inert atmosphere and argon can be used for this purpose. The time during which the heat and pressure is applied will depend on the size of the block and should be sufficient to ensure that the heat spreads throughout the block during the time that the pressure is applied.

After forming a block in the manner described above it is then cut along its width into a plurality of strips each having a length (being the dimension parallel to the lie of the carbon fibres) corresponding to the desired length of a brush. Each strip will have a width (being its dimension at right angles to the lie of the fibres) which is either equal to or several times the width of an individual brush and at this stage one side of each strip along its width can be machined to give an appropriate radius to one end of each brush to correspond to the radius of a commutator in contact with the brush when the brush is installed in an electrical machine.

Finally the plating around the individual fibres along the machined surface is removed for part only of the length of each strip to expose the individual carbon fibres.

The method of removal should be such that the carbon fibres are not excessively weakened and a convenient method is to immerse the strips in a dilute solution of nitric or sulphuric acid of a strength of about 25–30v/o. If sulphuric acid is used the concentration can be a little higher than for nitric acid.

It may be possible to speed up the removal of the plating from the part of the strips immersed in the solution by reverse electroplating using the strips as anodes.

In order to prevent passivation due to the formation of gas films the electrolyte should be well stirred and the electrolyte may be kept under pressure to ensure penetration of the liquid between the fibres as the plating off progresses.

Finally where the material being deplated is in the form of strips the strips can be cut parallel to the carbon fibres to provide individual electrical brushes.

While the above process has been described with reference to type II carbon fibres it will be appreciated that the type I group fibres can also be used utilizing the natural springiness of the fibres to obtain constant pressure,

I claim:

1. A method of manufacturing an electrical brush comprising the steps of forming a block of an aligned array of carbon fibres embedded in a matrix of conductive material and then removing the conductive material along part only of the length of the block to expose the carbon fibres at one end but leaving the remaining parts of the fibres consolidated in the matrix of conductive material for enabling connection to be made to a conductor.

2. The method as claimed in claim 1 in which the block has a length which is a plurality of times the desired length of an individual brush and is cut into individual lengths corresponding to the required length of a brush prior to removal of conductive material.

3. The method as claimed in claim 1 in which the block is formed in the shape of a plate of rectangular cross-section having a length and a width which are a plurality of times the desired length and width of an electrical brush and the block is first cut along its width into strips each having a length corresponding to the desired length of a brush and after the removal of the conductive material from one edge of each strip the strips are then cut along their lengths to provide individual brushes.

4. The method as claimed in claim 1 in which the thickness of the block of carbon fibres corresponds to the desired thickness of an electrical brush.

5. The method as claimed in claim 1 in which the carbon fibre block is formed by coating the carbon fibres with a suitable metal and then pressing the coated fibres together while heating them so that the coatings of the individual fibres are welded together.

6. The method as claimed in claim 5 in which the metal coating is applied by an electroplating process.

7. The method as claimed in claim 1 in which the conductive material is selected from the group comprising copper and tin.

8. The method as claimed in claim 1 in which the block is formed by wetting the carbon fibres with a suitable metal in liquid form, pressing the wetted carbon fibres together and then cooling them to solidify the metal.

9. The method as claimed in claim 1 in which a radius is formed at one end of each length of carbon block prior to removal of the conductive material from that end so as to improve contact with a commutator.

* * * * *